United States Patent [19]
Farkash et al.

[11] Patent Number: 5,594,554
[45] Date of Patent: Jan. 14, 1997

[54] IMAGE COMPRESSION CODER HAVING IMPROVED SCALE FACTOR CONTROL

[75] Inventors: Shmuel Farkash; Rafael Retter, both of Haifa; Ruth Adar, Nesher; Aharon Gill, Haifa, all of Israel

[73] Assignee: Zoran Corporation, Santa Clara, Calif.

[21] Appl. No.: 131,790

[22] Filed: Oct. 4, 1993

[51] Int. Cl.⁶ .................................................. H04N 1/415
[52] U.S. Cl. ......................... 358/426; 358/430; 358/433
[58] Field of Search ..................................... 358/426, 427, 358/261.2, 430, 432, 433; 348/403, 405, 409, 419, 425; 382/56, 50, 238–240, 245, 246, 248, 250–251; H04N 1/41, 1/415

[56] References Cited

U.S. PATENT DOCUMENTS

| | | | |
|---|---|---|---|
| 5,051,840 | 9/1991 | Watanabe et al. | 358/432 |
| 5,157,488 | 10/1992 | Pennebaker | 348/405 |
| 5,323,187 | 6/1994 | Park | 348/405 |
| 5,416,604 | 5/1995 | Park | 358/433 |
| 5,475,502 | 12/1995 | Lee et al. | 358/426 |

OTHER PUBLICATIONS

Zoran Corporation Preliminary Specification Sheet for the ZR36040 JPEG Image Coder/Decoder, Aug. 1992.

*Primary Examiner*—Kim Vu
*Attorney, Agent, or Firm*—Townsend and Townsend and Crew LLP; Henry K. Woodward

[57] ABSTRACT

Disclosed is an image compression coding device in which time domain image data is transformed to frequency domain data and then compressed by multiplying the frequency domain data by quantization coefficients scaled by a scale factor based on a non-linear relationship of log(ACVdata) versus log(SF). One or more statistical passes are made through the frequency domain data using initial scale factors in which ACV data is obtained based on the newly defined relationship. The New Scale Factor (NSF) is then calculated based on the initial scale factors (ISF1, ISF2), the accumulated code volumes for the two scale factors (ACVdata1, ACVdata2), and the target code volume (TCV) of the compressed file.

9 Claims, 2 Drawing Sheets

IMAGE COMPRESSION CODER HAVING IMPROVED SCALE FACTOR CONTROL

BACKGROUND OF THE INVENTION

This invention relates generally to image compression, and more particularly the invention relates to discrete cosine transform (DCT) based compression and coding of images.

Image compression is used in reducing large volumes of data in digitized images for convenient and economical storage and for transmission across communication networks having limited bandwidth. Image compression technology is important in digital still video cameras, color scanners, color printers, color fax machines, computers, and multimedia.

The joint photographic experts group (JPEG) has established a color image data compression standard for use in a variety of still image applications. Compression employs DCT-based processes operating on discrete blocks of the image. The DCT coefficients are then quantized based on measurements of the threshold for visibility. For coding, an 8×8 pixel array of DCT coefficient is reorganized into a one dimensional list using a zigzag sequence which tends to concentrate coefficients expressing the lowest spatial frequencies at lower indices with the DC component being number 0 in the zigzag. The quantized coefficients are then encoded using a Huffman coder. Finally, headers and markers are inserted in the codes for individual blocks along with bit and byte stuffings for JPEG data compatibility. FIG. 1 illustrates the JPEG compression algorithm.

The compressed data can then be stored (as in an electronic still camera or computer memory) or transmitted efficiently over a limited bandwidth communication network. Reconstruction of the image requires a reverse process in which the headers and markers are extracted, the Huffman code is decoded, coefficients are dequantized, and an inverse DCT (IDCT) operation is performed on the coefficients.

Zoran Corporation (assignee herein) has developed a chip for image compression. The chip employs an algorithm for high quality compression of continuous tone color or monochrome images based on the JPEG standard. The chip reduces the large data size required to store and transmit digital images by removing redundancies in the image data while maintaining the ability to reconstruct a high quality image. For example, in digital still video cameras, the chip enables the use of 1M byte solid state memory card instead of a 24M byte hard disk to store 24 768×480 pixel images. The chip also reduces the time required to transmit a 768×480 pixel image over a standard 9600 bits per second telephone line from 15 minutes to 40 seconds. The chip has been optimized for use in digital still video cameras, color video printers, fixed bit rate image transmission devices, security systems, and call sensitive image compression systems.

Bit rate control (BRC) is utilized in compressing the image into the predetermined file size. To execute the bit rate control algorithm, the coder performs two-pass compression including a statistical pass (Pass 1) throughout the image prior to the actual compression pass (Pass 2). The activity of the image and of every block are computed during the statistical first pass through the image. A scale factor for the quantization mechanism is computed according to the image activity, and the code volume of each image block is limited based on the activity of that block. Remainder bits are transferred to the allocation for the next block to improve the target compressed image size utilization.

The quantization of the coefficients is done by using quantization tables. The compression ratio is controlled by uniformly scaling the quantization tables with a scale factor. A large scale factor results in a high compression ratio and vice versa. The mechanism to determine the scale factor is by using the two passes: the first pass through the image is done with an initial scale factor (ISF). The quantization tables are scaled with the initial scale factor. Code volume needed for encoding the quantized DCT coefficients is accumulated during this pass using the Huffman tables (ACV data). This code volume is then used as an activity measure of the image. A new scale factor (NSF) is calculated from the TCV data and ACV data and from the initial scale factor by:

$$NSF = \frac{SF}{\left(\frac{TCV\ DATA}{ACV\ DATA}\right)^{1.5}} \quad (1)$$

The new scale factor (NSF) is then used for the second pass in which the actual encoding is done.

The total code volume is controlled by limiting the code volume of each block. Each block is allocated a code volume (ABCV) with the block allocation depending on an allocation factor (AF) and on an activity measure of that block.

For example, the allocation factor can be computed as the ratio between the target code volume (TCV) and the image activity which was accumulated in the statistical pass using the DCT coefficients (ACT). The activity of each block is measured by its block activity (BACT). ACT and AF are calculated as follows:

$$ACT = \sum_{blocks} BACT \quad (2)$$

$$AF = \frac{TCV\ data}{ACT} \quad (3)$$

The allocated code volume for each block is the product of the block activity and the allocation factor (AF×BACT).

The above algorithm (1) assumes a linear relation between log(ACV) and log(SF), where the slope of the line is assumed to be −2/3. Thus, in the first pass, the second parameter of the line is computed, from which the NSF is calculated in equation (1). However, the assumption of the line slope rarely matches the real situation. Although the straight line assumption holds for a wide range of SF values, the slope of the line depends on the image, and it ranges between −0.5 and −1.0. This mismatch may cause big deviations in the resultant code volume (deviations of more than 60% have been measured), thus, severely reducing the coder performance.

The present invention is directed to an improved method and apparatus for image compression by providing a more accurate value for the new scale factor based on an informed definition of the relationship between Accumulated Code Volume (ACV) and Scale Factor (SF).

SUMMARY OF THE INVENTION

In accordance with the invention, a New Scale Factor (NSF) is calculated using a linear relationship of log(ACV data) and log(SF) which varies from −1.0 to −0.5 as illustrated by the straight portion of the graph in FIG. 2.

This model leads to an alternative New Scale Factor (NSF) algorithm in which two points along the linear portion of the model are measured, from which the exact line parameters are computed.

The New Scale Factor (NSF) is then determined using the exact line parameters and the Target Code Volume (TCV) from the following equation:

$$\log(NSF) = \frac{\log\left(\frac{ISF1}{ISF2}\right)}{\log\left(\frac{ACV\,\text{data1}}{ACV\,\text{data2}}\right)} \times \log\left(\frac{TCV}{ACV\,\text{data1}}\right) + \log(ISF1) \quad (4)$$

where, (ISF1,ACVdata1) and (ISF2,ACVdata2) are the two values along the line log(ACVdata) versus log(SF).

In accordance with preferred embodiments, a three Pass implementation uses two statistical passes with different Initial Scale Factors (ISF1, ISF2) to compute ACVdata1 and ACVdata2, from which the NSF for the third pass (coding pass) is computed.

In another embodiment, a "Two Pass" implementation uses two half length statistical passes in which the parameters needed to calculate the NSF for the coding pass (second pass) are estimated. The "Two Pass" embodiment is more complex than the Three Pass embodiment but requires only two thirds (2/3) the time needed in the Three Pass embodiment.

The invention and objects and features thereof will be more fully understood from the following detailed description and appended claims.

DETAILED DESCRIPTION OF ILLUSTRATIVE EMBODIMENTS

Figure 1:
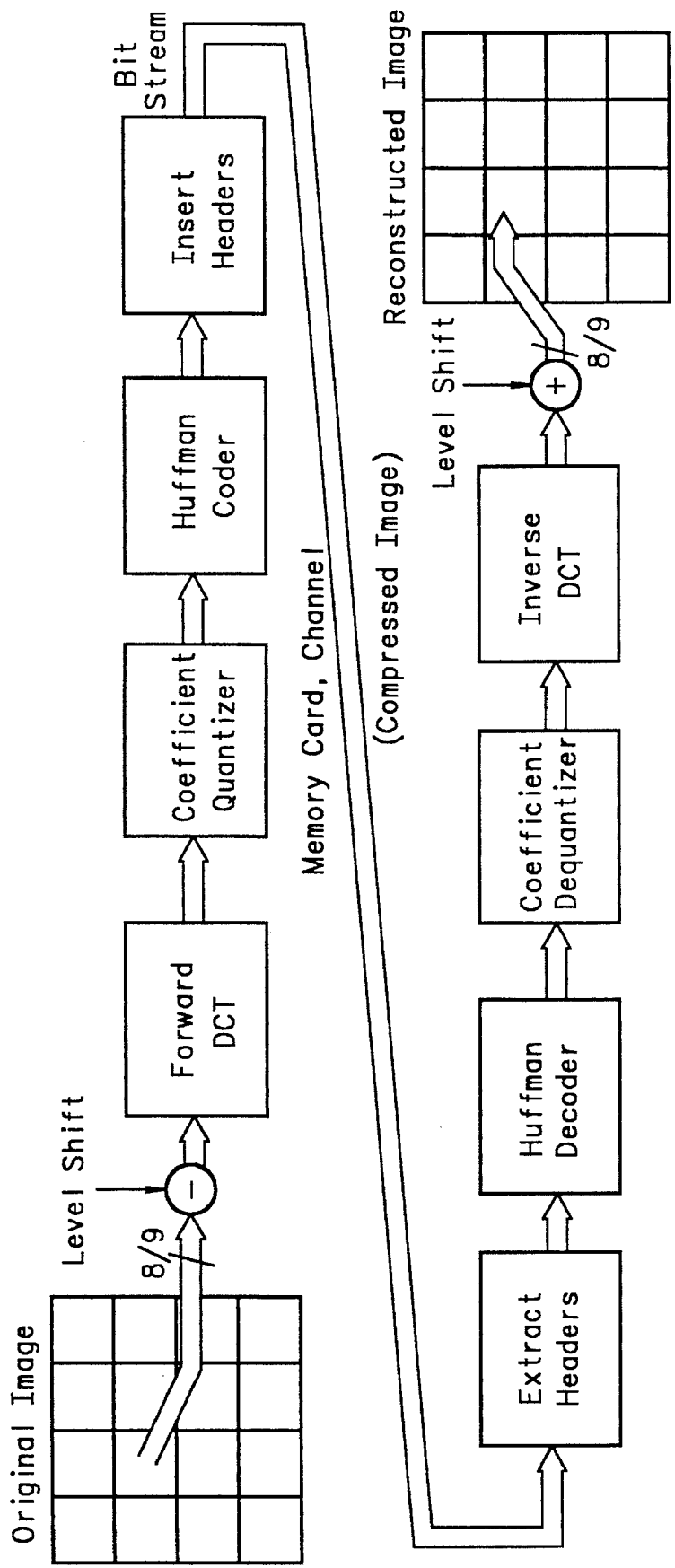
FIG. 1 is a functional block diagram illustrating a compression/decompression algorithm.
Figure 2:
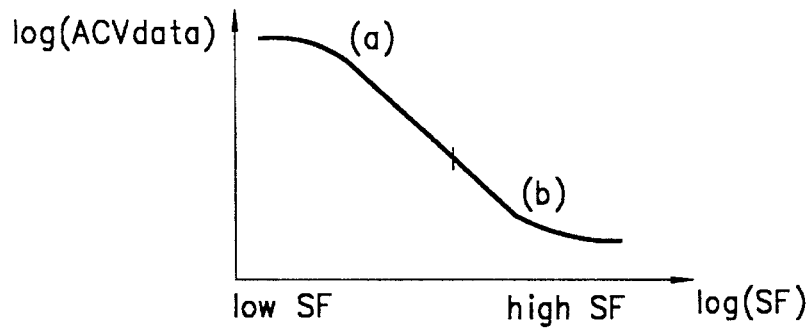
FIG. 2 is a curve illustrating the relationship of log(ACVdata) to log(SF), in accordance with the invention.

Image compression in accordance with the invention is based on a more suitable model of the graph log(ACVdata) versus log(SF) as is shown in FIG. 2. The slope of the straight portion of the graph ranges from −1.0 to −0.5 rather than the prior art fixed −2/3 value, and there are saturation phenomena at low and high scale factors. The saturation phenomena are due to the finite step size of the quantization tables. The model illustrated in FIG. 2 leads to a New Scale Factor estimation (NSF) calculation method in which two points along the straight line portion of the line are measured, from which the exact line parameters are computed using equation (4), supra. The New Scale Factor (NSF) is determined by using the exact line parameters and the Target Code Volume (TCV).

Figure 3:
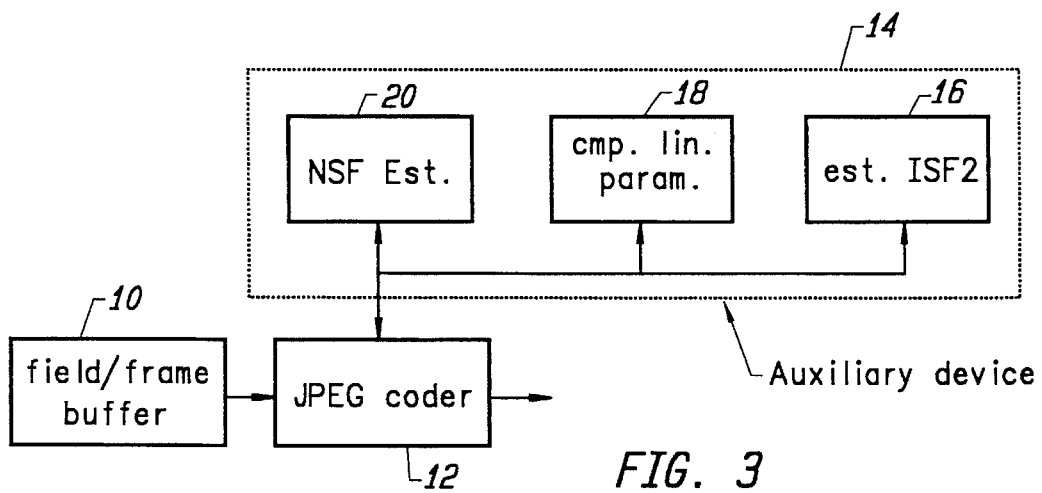
FIG. 3 is a functional block diagram illustrating a Three Pass scale factor computations for use in quantization of the image data.
Figure 4:
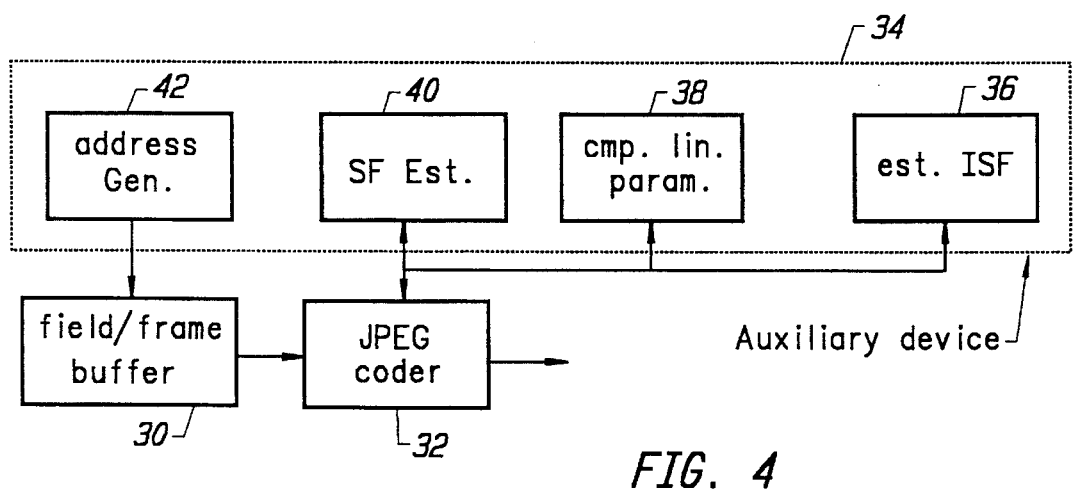
FIG. 4 is a functional block diagram illustrating a "Two Pass" scale factor computation for use in quantization of the image data.

FIG. 3 and FIG. 4 are functional block diagrams illustrating two embodiments in calculating the New Scale Factor (NSF). In the embodiment of FIG. 3, three passes through the frequency spectrum transformed data are made. The first two passes use a first initial scale factor (ISF1) and a second initial scale factor (ISF2) to accumulate code volume for each pass (ACVdata1 and ACVdata2, respectively). Next, the New Scale Factor (NSF) is computed according to equation (4), and finally the coding pass is performed using the NSF, yielding the compressed data. The compressed data is then passed to a coder such as the Huffman coder in a JPEG embodiment.

In the first pass, the coder performs a statistical pass on the image using ISF1, which is dependent on the desired rate, yielding ACVdata1 and ACT. Using the ACT, ISF2 is determined according to a predetermined table which depends on the desired rate. ISF2 is used in the second statistical pass, producing ACVdata2. The exact line parameters are computed and used along with the TCV to determine the New Scale Factor (NSF) block 20.

FIG. 4 is a block diagram illustrating a "Two Pass" implementation of the invention. The address generator 42 addresses half of the image (e.g., odd pixels) into the JPEG coder. The coder performs Pass One using a prescribed ISF1, the resultant ACV data and ACT are stored in the auxiliary device. Using this ACT (or alternatively the ACV data), ISF2 is determined in block 36, the other half of the image (e.g., even pixels) undergoes Pass One using ISF2, and its ACV data are stored. The exact straight line parameters are computed in block 38 and used along with the TCV to determine the NSF in block 40. Time needed for the "Two Pass" implementation may be shortened by applying the statistical pass on a smaller portion of the image (e.g., every second pixel).

There has been described an improved method of bit rate control for image data compression and decompression based on an improved definition of the relationship between Accumulated Code Volume (ACV) and Scale Factor (SF) for image data. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. An image compression coding device for use in efficient storage and transmission of digital image data comprising a transform means for transforming spatial domain image data to frequency domain image data, quantizing means for compressing said frequency domain image data by multiplying said frequency domain image data by quantization coefficients scaled by a Scale Factor, said Scale Factor being determined according to the following equation:

$$\log(NSF) = \frac{\log\left(\frac{ISF1}{ISF2}\right)}{\log\left(\frac{ACV\,\text{data1}}{ACV\,\text{data2}}\right)} \times \log\left(\frac{TCV}{ACV\,\text{data1}}\right) + \log(ISF1) \quad (4)$$

where NSF is the new scale factor for use in said quantizing means,
TCV is a target code volume,
ISF1, ISF2 are initial scale factors used in two statistical passes,
ACVdata1, ACVdata2 are accumulated code volume of coded data in said two statistical passes, and means for encoding said compressed frequency domain image data.

2. The image compression coding device as defined by claim 1 wherein log ACVdata and log scale factor are related by a curve having a slope ranging from −1 to −0.5 with saturation at low scale factors and at high scale factors.

3. The image compression coding device as defined by claim 2 wherein

ISF1 and ACVdata1 are obtained from a first statistical pass through said frequency domain image data, ISF2 and ACVdata2 are obtained from a second statistical pass through said frequency domain image data, and said frequency domain image data are compressed in a third pass through said frequency domain image data using the calculated scale factor.

4. The image compression coding device as defined by claim 2 wherein ISF1, ACVdata1, ISF2, and ACVdata2 are estimated in two shorter statistical passes, and said frequency domain image data are compressed in a second pass through said frequency domain image data using the calculated scale factor.

5. A method of image compression coding for use in efficient storage and transmission of digital image data comprising transforming time domain image data to frequency domain image data, and compressing said frequency domain image data by multiplying said frequency domain image data by quantization coefficients scaled by a scale factor, said scale factor being determined according to the following equation:

$$\log(NSF) = \frac{\log\left(\frac{ISF1}{ISF2}\right)}{\log\left(\frac{ACV\text{data1}}{ACV\text{data2}}\right)} \times \tag{4}$$

-continued $$\log\left(\frac{TCV}{ACV\text{data1}}\right) + \log(ISF1)$$

and encoding said compressed frequency domain image data.

6. The method as defined by claim 5 wherein log ACVdata and log scale factor are related by a curve having a slope ranging from −1 to −0.5 with saturation at low scale factors and at high scale factors.

7. The method as defined by claim 6 wherein

ISF1 and ACVdata1 are obtained from a first statistical pass through said frequency domain image data, ISF2 and ACVdata2 are obtained from a second statistical pass through said frequency domain image data, and said frequency domain image data are compressed in a third pass through said frequency domain image data using the calculated scale factor.

8. The method as defined by claim 6 wherein ISF1, ACVdata1, ISF2, and ACVdata2 are estimated in two short statistical passes, and said frequency domain image data are compressed in a second pass through said frequency domain image data using the calculated scale factor.

9. The method as defined by claim 7 wherein said first pass is on odd address data using a first initial scale factor (ISF1) and on even address data based on a second initial scale factor (ISF2) determined from the pass through odd address image data.

* * * * *